United States Patent [19]

Williamson

[11] 4,042,182

[45] Aug. 16, 1977

[54] CRUSHING, MATERIAL-REDUCING, GRINDING AND LIKE MACHINES

[75] Inventor: Arthur Gerard Williamson, Shrewsbury, England

[73] Assignee: Mazel Holdings Limited, Douglas Isle of Man, England

[21] Appl. No.: 637,100

[22] Filed: Dec. 2, 1975

[30] Foreign Application Priority Data

Dec. 3, 1974 United Kingdom ............... 52287/74

[51] Int. Cl.2 ......................... B02C 15/10; B32B 27/40

[52] U.S. Cl. ..................................... 241/207; 428/423; 428/425

[58] Field of Search ............... 260/77.5 AN, 77.5 AP, 260/77.5 AM; 428/423, 425; 241/207-231

[56] References Cited

U.S. PATENT DOCUMENTS

| | | | |
|---|---|---|---|
| 3,284,539 | 11/1966 | McElroy | 260/858 |
| 3,677,869 | 7/1972 | Chung et al. | 260/858 |

FOREIGN PATENT DOCUMENTS

| | | |
|---|---|---|
| 1,148,406 | 10/1969 | United Kingdom |

*Primary Examiner*—William R. Dixon, Jr.
*Attorney, Agent, or Firm*—Browdy and Neimark

[57] ABSTRACT

A crushing part or component of a gyratory grinder or other crushing, grinding or material-reducing machine is provided with a shock-absorbing backing material which has improved toughness and resilience and is formed of a filled polyurethane resin composition the resin component of which is derived from a cold-curing system comprising i. at least one polyether polyol having more than 2—OH groups per molecule, ii. at least one polyol containing both ester and ether groups and having more than 2—OH groups per molecule, iii. at least one polyether diol and iv. at least one aromatic polyisocyanate, there being an excess of CNO groups over —OH groups in the system.

8 Claims, 1 Drawing Figure

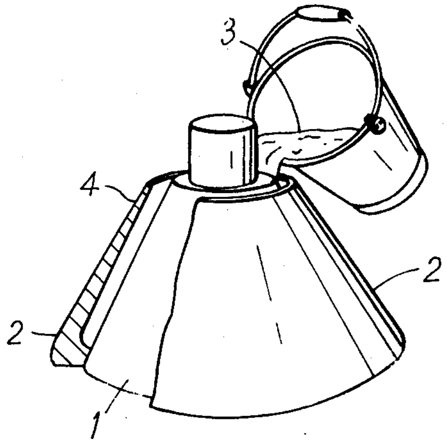
3
4
2
2
1

CRUSHING, MATERIAL-REDUCING, GRINDING AND LIKE MACHINES

This invention relates to the provision of a shock-absorbing backing material for the crushing parts or components of crushing, material-reducing, grinding and like machines.

In crushing machines either of the moving jaw or revolving cone type, it is known to provide the crushing parts or components which are subject to wear, e.g. the jaws of stone crushers and gyratory type crushers, with a backing of shock-absorbing material. This material is generally provided by pouring a suitably formulated liquid into the cavity between the head, mantle or jaw backing and the part which is subject to wear, e.g. the jaw, and allowing the liquid to set in situ.

In the past, zinc or solder has been used as the backing material but more recently there has been a trend towards cold-curing synthetic resins whose use obviates many of the disadvantages associated with having to handle metals in the molten state.

Thus, in our British Patent specification No. 1,148,406, we describe and claim a machine part or component for use in crushing, material reducing, grinding and like machines in which the layer of backing material in close contact with the wearable metal portion is derived from a cold-curing resin system comprising a polyol and a polyisocyanate. Such systems, which generally also contain one or more fillers, are prepared by mixing together a first component which contains the polyol and a second component which contains the polyisocyanate and the resultant mixture is then poured into the cavity where it sets. The viscosity characteristics of these systems as a function of temperature are such that the materials are satisfactorily pourable over a wide range of climatic conditions so that repairs or replacements can be carried out under field conditions in most countries of the world. In particular, these systems may be used even under freezing conditions without having to use heat though the application of heat may help in some circumstances. Moreover, the viscosity of the system can be made low enough to ensure, during application, that the material closely follows the contours of the space into which it is introduced and that thereby the danger of the formation of trapped air pockets at the metal interface is reduced.

However, in addition to these desirable handling characteristics, it is necessary for these systems to set to backing materials which have adequate toughness and resilience for the intended application.

The present invention provides a polyol/polyisocyanate system the use of which results in a backing composition which has a particularly good combination of toughness and resilience which is better than that of any other synthetic resin-based backing that we have met hitherto.

According to the present invention, there is provided a machine part or component for use in crushing, material reducing, grinding and like machines, including a wearable metal portion and a layer of shock-absorbing backing material in close contact therewith in which said backing material comprises a filled polyurethane resin composition, the polyurethane resin being derived from a cold-curing system comprising (a) a polyol component comprising (i) one or more polyether polyols each having at least two hydroxyl groups per molecule, the average number of hydroxyl groups per molecule being more than 2, and preferably about 3, e.g. 2.7 to 3.3, (ii) one or more polyols each having at least two hydroxyl groups per molecule and containing both ether and ester groups, the average number of hydroxyl groups per molecule being more than 2 and preferably about 3 e.g. 2.7 to 3.3, and (iii) at least one polyether diol; and (b) an aromatic polyisocyanate which is present in an amount such that there is an excess of isocyanate groups over hydroxy groups in the system.

Preferably, the proportions of the polyether polyol constituent and the polyol constituent containing both ether and ester groups present in the system are such that the former constituent provides approximately two to three, e.g. from 1.5 to 3.5, hydroxy groups for each hydroxy group provided by the latter constituent. The diol constituent preferably forms a minor portion of the polyol component, e.g. providing about 10 to 30% more preferably 15 to 25% of the total number of hydroxyl groups in the polyol component.

It is also preferred that the diol is of lower molecular weight than the two polyol constituents. For example, the molecular weight of the diol is preferably below 500 and even below 300 whereas the molecular weights of the two polyol constituents are preferably at least 500 and may be greater than 1000 e.g. up to 2000. However, the polyol constituents preferably contain at least $2\frac{1}{2}$ to 3% OH at the minimum, e.g. preferably from 4 to 20% OH, by weight.

The aromatic polyisocyanate may be, for example, one or a mixture of toluene diisocyanate isomers or a compound or compounds containing two or more isocyanatophenyl groups, e.g. a bis (isocyanatophenyl)alkane such as bis(4-isocyanatophenyl) methane or 1,1-bis(4-isocyanatophenyl) propane.

Although other filler materials such as carbonaceous material and finely divided metals, e.g. aluminium and/or steel powder, may be used, it is preferred that the filler, or at least a major proportion thereof, be of mineral origin. Examples of such fillers are finely divided slate, clays, sands, metal oxides, metal salts of inorganic acids, e.g. barium sulphate, calcined metal salts, e.g. calcined malachite, and finely divided glass, e.g. fibrous glass or powdered glass. Preferably the filler forms a major proportion of the backing material, for example from 60 to 75% by weight.

Other additives may also be included in the mixture with the filler and the resin-forming system, e.g. viscosity regulators (to assist flow), accelerators for the resin-forming reaction and dehydrators which may be, for example, materials which react with moisture or which physically adsorb or absorb it, e.g. molecular sieves such as zeolites.

The components of the backing material may be mixed together in any suitable manner provided that the contacting of the polyisocyanate with the polyols and/or diol is not effected until just before pouring is to commence since the resin-forming reaction, which eventually results in the polyol component and polyisocyanate forming a solid mass, commences quite soon after such contacting. Moreover, if any of the constituents of the polyol component are incompatible with each other, they should not be mixed together until just before pouring is to commence.

Suitably, the filler material, additives, if any, and polyether polyol are first mixed together and then the other polyol and the diol are added to this mixture, preferably as a preformed mixture. The polyisocyanate is then included immediately before pouring.

In order to facilitate rapid removal of the metal portion when worn from a machine, a release agent such as silicone oil can be applied to the wearable metal portion prior to the application of the backing material, so as to prevent adherence of the backing material to the metal portion.

The backing material is especially suitable for use with machine parts and components used in gyratory crushers.

An example of the machine part or component in accordance with the invention for use in a gyratory crusher is shown in the accompanying drawing which is a part cut-away view of a gyratory crusher having a wearable metal portion.

The drawing shows part of a crushing head or inner core 1 and an outer mantle 2. The crushing head 1 has a lining of wear resistant material such as steel or a manganese steel alloy on its surface. The ingredients forming the backing material are mixed to form a liquid material 3, which is then poured into the cavity between the head and the mantle where it sets to form a solid backing material 4.

In operation the mantle 2 is placed over the head 1, leaving a space between the two components. The ingredients forming the backing material are mixed to form the liquid material 3 which is then poured into the space until it is completely filled, and sets therein to form a solid backing material 4. If desired, a release agent such as silicone oil can be applied to the head 1 to prevent adherence to the backing material 4 thereto. The same release agent can at the same time be applied to any bolts used, to prevent adherence.

One Example of a formulation for a backing layer suitable for use in the present invention is now given, all parts being expressed as parts by weight:

EXAMPLE

| Component A. | |
|---|---|
| 1. Barytes (up to 100 mesh) | 62.65 parts |
| 2. China clay | 3.9 parts |
| 3. Slate powder | 5.9 parts |
| 4. Branched polyether polyols having nominally three -OH groups per molecule and an OH content of approximately 11.5% by weight | 11.3 parts |
| 5. Zeolith T Paste (Bayer UK) | 4.8 parts |
| 6. Branched polyalcohols containing ether and ester groups and having nominally three -OH groups per molecule and an OH content of approximately 5% by weight. | 10.45 parts |
| 7. Short chain polyether diols having an OH content approximately 22% by weight. | 2.00 parts |

Component B

Aromatic diisocyanate containing approximately 30% NCO - 19.4 parts

Components 1–5 are intimately mixed to give a very stiff paste. Components 6 and 7 are then mixed together with very slow stirring to avoid the formation of bubbles until a homogeneous transparent liquid is produced. This is then added to the stiff paste incorporating the other ingredients and the whole is homogenised. Component B is then blended with this immediately before casting.

The more important physical properties of the backing material obtained from this mix are set out below.

| | |
|---|---|
| Tensile strength MN/m² | 26.5 |
| Hardness (Rockwell R) | 102 |
| Specific Gravity | 1.89 |
| Charpy Impact, Kg f cm/cm² | 2.7 |
| Flexural strength, MN/m² | 51.4 |

-continued

| | |
|---|---|
| Flexural modulus, MN/m² | 8040 |
| Heat Distortion Temp., % (0.45 MN/m² test) | 47 |
| Crushing Strength, MN/m² | 79.5 |
| Compressive Modulus, MN/m² | 599 - 698 |

It will be seen that this material combines a high compressive modulus with good flexural and tensile strengths and yet has adequate impact strength, thereby demonstrating a particularly desirable combination of toughness and resilience. Crushing strength and hardness are also good.

The backing material described herein can be applied to the backing plates of jaw crushers, concaves and segments of grinding mills. In this case, and similar cases, the flat jaw may contain cores which require filling or require application of the release agent for threads of holding bolts.

I claim:

1. A machine part or component for use in crushing, material reducing, grinding and like machine, including a wearable metal portion and a layer of shock-absorbing backing material in close contact therewith in which said backing material comprises a filled polyurethane resin composition, the polyurethane resin being the reaction product of a cold-curing system comprising (a) a polyol component comprising (i) at least one polyether polyol having at least two hydroxyl groups per molecule, the average number of hydroxyl groups per molecule being more than 2, (ii) at least one polyol having at least two hydroxyl groups per molecule and containing both ether and ester groups, the average number of hydroxyl groups per molecule being more than 2, and (iii) at least one polyether diol; and (b) at least one aromatic polyisocyanate which is present in an amount such that there is an excess of isocyanate groups over hydroxy groups in the system, said at least one polyether polyol providing from 1.5 to 3.5 hydroxyl groups per hydroxyl group provided by said at least one polyol containing ether and ester groups, and said at least one polyether diol providing 10 to 30% of the total number of hydroxyl groups in the polyol component the major proportion of said composition being filler and sufficient resin being present to bind the filler into a unitary component.

2. A machine part or component as claimed in claim 1 in which said at least one polyether diol has a molecular weight below 500, while said at least one polyether polyol and said at least one polyol containing both ether and ester groups have molecular weights exceeding 500.

3. A machine part or component as claimed in claim 2 in which the average number of hydroxyl groups per molecule of said at least one polyether polyol is in the range 2.7 to 3.3.

4. A machine part or component as claimed in claim 2 in which the average number of hydroxyl groups per molecule of said at least one polyol containing both ether and ester groups is in the range 2.7 to 3.3.

5. A gyratory crusher including a machine part or component as claimed in claim 2.

6. A machine part or component as claimed in claim 1 in which said at least one polyether diol has a molecular weight below 500.

7. A machine part or component as claimed in claim 1 in which said at least one polyether polyol and said at least one polyol containing both ether and ester groups have molecular weights exceeding 500.

8. A machine part or component as claimed in claim 1 in which the filler forms from 60 to 75% by weight of the backing material.

* * * * *